United States Patent [19]

Chenot et al.

[11] Patent Number: 4,719,033

[45] Date of Patent: Jan. 12, 1988

[54] PROCESS FOR PRODUCING EUROPIUM ACTIVATED STRONIUM TETRABORATE UV PHOSPHOR

[75] Inventors: Charles F. Chenot, Towanda, Pa.; Michael A. Krebs, Waverly, N.Y.

[73] Assignee: GTE Products Corporation, Stamford, Conn.

[21] Appl. No.: 903,181

[22] Filed: Aug. 28, 1986

[51] Int. Cl.$^4$ .......................................... C09K 11/465
[52] U.S. Cl. ............................................. 252/301.4 R
[58] Field of Search .............................. 252/301.4 R

[56] References Cited

PUBLICATIONS

Machida et al, "J. of Lumin.", 21, (1979), pp. 101–110.
Torii et al, "Chem. Abstracts", vol. 82, 1975, 37922w.

Primary Examiner—Jack Cooper
Attorney, Agent, or Firm—Donald R. Castle; L. Rita Quatrini

[57] ABSTRACT

A europium activated strontium tetraborate UV emitting phosphor is disclosed having a weight composition of from about 34.72% to about 35.80 strontium %, from about 17.66% to about 17.78 boron %, from about 0.37% to about 1.86% europium, and the balance oxygen. The phosphor has essentially elongated prism-like particles with the europium relatively uniformly distributed throughout the balance of the phosphor and with the particle size distribution being characterized by the 50% size being in the range of from about 7 micrometers to about 12 micrometers as determined by Coulter Counter measurement and with less than about 12% by weight of the particles having a particle size of greater than about 16 micrometers as determined by Coulter Counter measurement. The process for making the phosphor is disclosed which involves forming a mixture of strontium oxide and europium carbonate in an aqueous solution of boric acid at a temperature of at least about 70° C. with the mole ratio of $SrCO_3$ to $H_3BO_3$ being from about 1:4 to 1:4.5 and the $Eu_2O_3$ content being from about 0.003 to 0.015 moles. The mixture is digested at at least about 90° C. for a sufficient time to form a solid precipitate comprising a strontium borate hydrate intermediate and a liquor, followed by separating the solid from the liquor, drying the solid and firing the solid in an atmosphere of 0.3% to 3.0% by volume hydrogen and the balance nitrogen at at least about 800° C. for a sufficient time to produce the phosphor.

10 Claims, 4 Drawing Figures

2000X SEM Photograph of Phosphor Prepared
via Prior Art

2000X SEM Photograph of Phosphor Prepared
via This

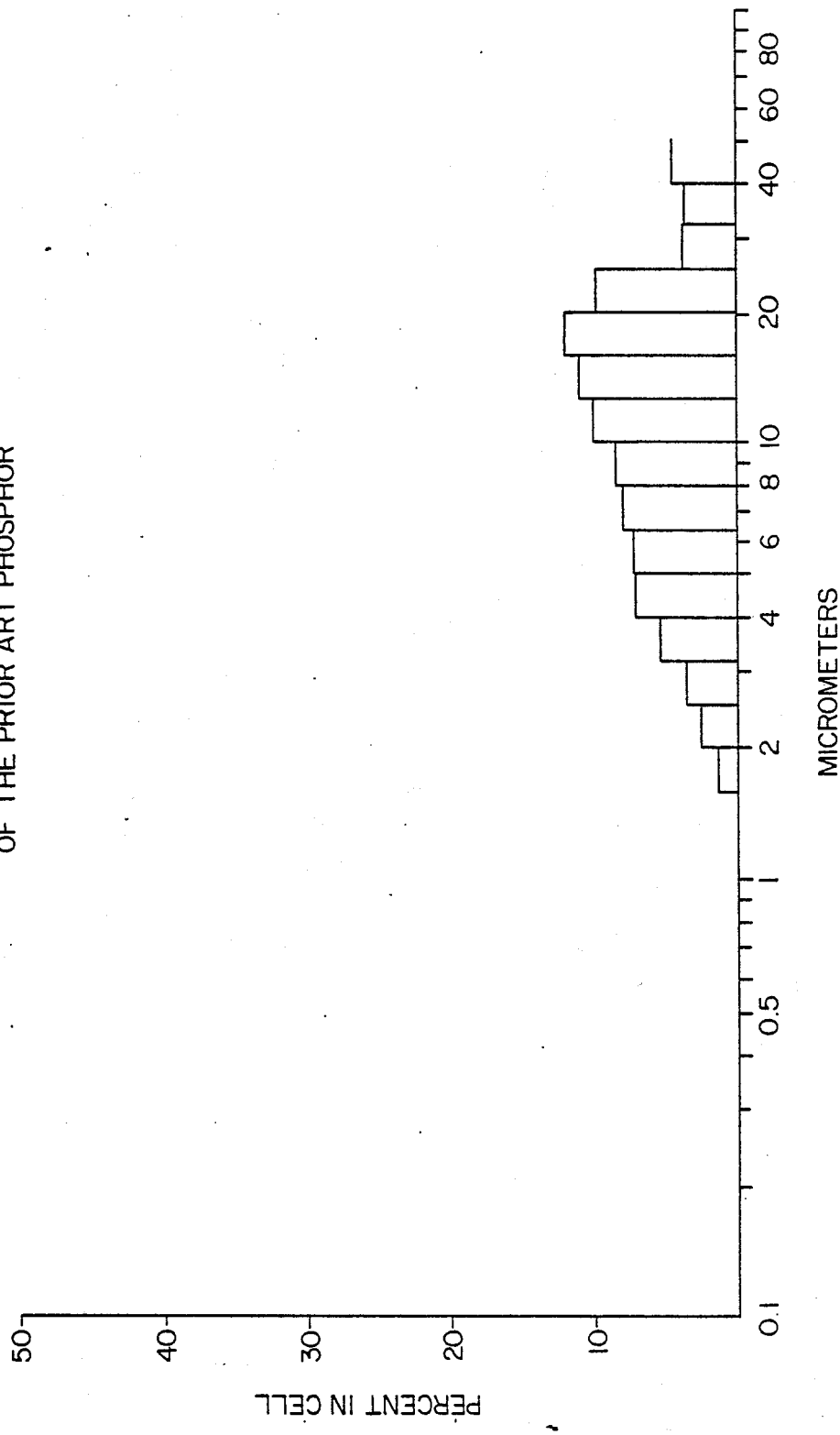
FIG.3 COULTER COUNTER FREQUENCY DISTRIBUTION OF THE PRIOR ART PHOSPHOR

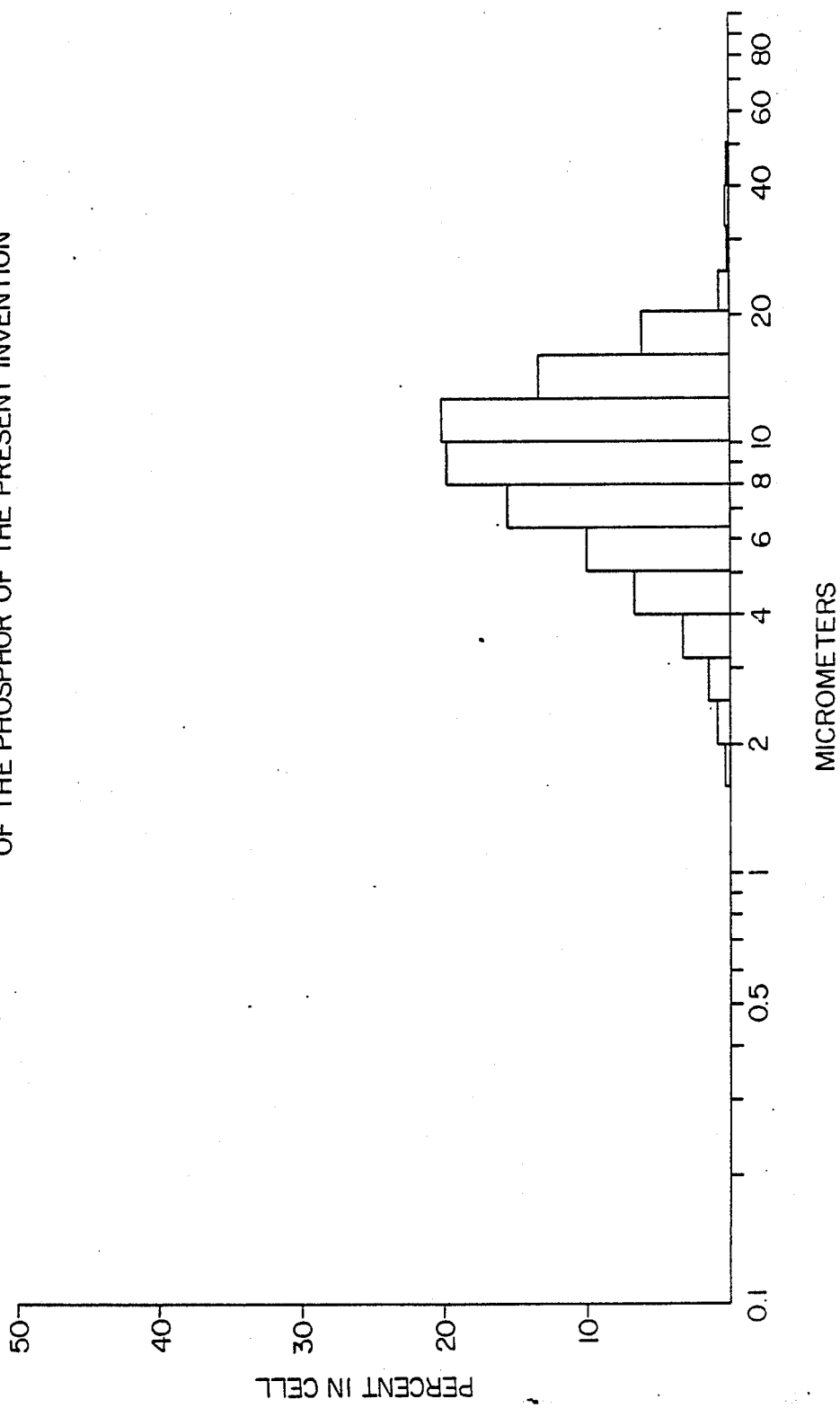
FIG. 4 COULTER COUNTER FREQUENCY DISTRIBUTION OF THE PHOSPHOR OF THE PRESENT INVENTION

PROCESS FOR PRODUCING EUROPIUM ACTIVATED STRONTIUM TETRABORATE UV PHOSPHOR

BACKGROUND OF THE INVENTION

This invention relates to a europium activated strontium tetraborate phorphor. It also relates to a process for producing the phosphor by a new chemical precipitation technique which results in the phosphor having essentially complete homogeneity of constituents including essentially complete incorporation of the europium activator and particle size control.

Ultraviolet emitting fluorescent lamp phosphors have been on the market for a number of years. However, phosphors emitting long wavelength, narrow band U.V. are essentially limited to europium activated strontium haloborates. Such phosphors are disclosed in U.S. Pat. Nos. 3,431,215 and 3,431,216. These phosphors are prepared by a multi-step process involving complex chemical precipitation of europium doped $SrB_6O_{10}.5H_2O$. This material is filtered, dried, and then combined with a strontium halide. The mixture is then air fired, ground, and blended with additional strontium halide and finally refired under $H_2/N_2$ and ground once more to achieve the desired particle size. The process is labor intensive and produces a product with a poorly developed particle habit with concomittant reduction of its theoretical emission efficiency.

German Patent Application Disclosure DE No. 3400385 A1 entitled "Low Pressure Mercury Vapor Discharge Lamp" describes europium activated strontium tetraborates. A europium activated strontium tetraborate containing fluroine is disclosed which is described as being equivalent to the material disclosed in U.S. Pat. No. 3,431,215. There is no indication in the German application of how this phosphor is produced. German Patent Application Disclosure No. 2,652,480 discloses europium activated strontium tetraborates which have either barium or magnesium.

SUMMARY OF THE INVENTION

In accordance with one aspect of this invention there is provided a europium activated strontium tetraborate UV emitting phosphor having a weight composition of from about 34.72% to about 35.80% strontium, from about 17.66% to about 17.78% boron, from about 0.37% to about 1.86% europium, and the balance oxygen. The phosphor has essentially elongated prism-like particles with the europium relatively uniformly distributed throughout the balance of the phosphor and with the particle size distribution being characterized by the 50% size being in the range of from about 7 micrometers to about 12 micrometers as determined by Coulter Counter measurement and with less than about 12% by weight of the particles having a particle size of greater than about 16 micrometers as determined by Coulter Counter measurement.

In accordance with another aspect of this invention, there is provided a process for producing the above described phosphor. The process involves forming a mixture of strontium carbonate and europium oxide in an aqueous solution of boric acid at a temperature of at least about 70° C. with the mole ratio of $SrCO_3$ to $H_3BO_3$ being from about 1:4 to about 1:4.5 and the $Eu_2O_3$ content being from about 0.003 to 0.015 moles. The mixture is digested at at least about 90° C. for a sufficient time to form a solid precipitate comprising a strontium borate hydrate intermediate and a liquor, followed by separating the solid from the liquor, drying the solid and firing the solid in an atmosphere of 0.3% to 3.0% by volume hydrogen and the balance nitrogen at at least about 800° C. for a sufficient time to produce the phosphor.

BRIEF DESCRIPTION OF THE FIGURES

FIG. 3 is a graph of the particle size distribution of the prior art phosphor of FIG. 1.

FIG. 4 is a graph of the particle size distribution of the phosphor of the present invention produced by the process of this invention.

DETAILED DESCRIPTION OF THE INVENTION

For a better understanding of the present invention, together with other and further objects, advantages and capabilities thereof, reference is made to the following disclosure and appended claims in connection with the above described figures and description of some of the aspects of the invention.

The phosphor of this invention has a weight composition of from about 34.72% to about 35.80% strontium, from about 17.66% to about 17.78% boron, from about 0.37% to about 1.86% europium, and the balance oxygen. The preferred weight composition is from about 35.17% to about 35.18% strontium, from about 17.71% to about 17.72% boron, from about 1.18% to about 1.25% europium, and the balance oxygen.

The preferred formula for the phosphor of this invention is $Sr_{1-x}B_4O_7:Eu_x$ where $x =$ from about 0.006 to about 0.03 and is preferably from about 0.018 to about 0.02.

Figure 1:
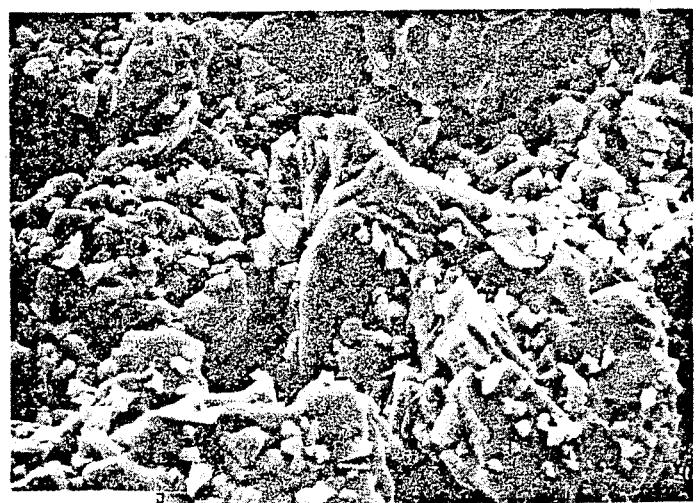
FIG. 1 is an SEM Photograph of a europium activated strontium fluoroborate prior art phosphor of U.S. Pat. No. 3,431,215.
Figure 2:
FIG. 2 is a SEM Photograph of the europium activated strontium borate phosphor of the present invention.

The preparation of the phosphor by the process of this invention results in well developed strain-free crystals emitting an intense, narrow band at about 370 nm. The phosphor has essentially elongated prism-like particles. The particle size distribution is characterized by the 50% size being in the range of from about 7 micrometers to about 12 micrometers as determined by Coulter Counter measurement. The coarse particle content is controlled so that less than about 12% by weight of the particles have a particle size of greater than about 16 micrometers as determined by Coulter Counter measurement. FIG. 2 is an SEM photograph of the phosphor of this invention. The prism-like character of the particles can be seen. Also it can be seen that there is a relatively small amount of coarse particles. FIG. 1 is an SEM photograph of the strontium borate phosphor of U.S. Pat. No. 3,431,215. The particles of FIG. 1 have very coarse particles and very fine particles. The difference in the particle size distribution between the prior art phosphor of U.S. Pat. No. 3,431,215 and the phosphor of this invention can be seen in FIGS. 3 and 4 respectively. The phosphor of the present invention is characterized by controlled reduction of the coarse fraction as is seen in the decrease in particle population of greater than about 20 micrometers.

The above characteristics of the phosphor of this invention are achieved by a novel precipitation technique involving the slow etching action of boric acid on the only partially soluble $SrCO_3$ and $Eu_2O_3$ compounds. This slow controlled precipitation reaction results in a more homogeneous set of conditions giving rise to better formed and larger crystals of the intermediate precipitate product. These larger intermediate precipitate particles provide for less material sintering during phosphor synthesis. This results in a more desirable particle size distribution characterized by the controlled coarse fraction, and also in particles which have an essentially prism-like morphology. This is important because the characteristic fluoescence of the phosphor is dependent on the crystal structure of the host material, that is, strontium tetraborate. Any variation of the chemical composition can cause some local distortions with the crystal which can lead to reduced efficiency, broadened emission bands and possible wavelength shifts in emission bands. Also, crystal imperfections related to formation techniques can cause problems similar to those caused by compositional variations.

In accordance with this invention, therefore, boric acid is first dissolved in water. The preferred mole ratio of boric acid to water is from about 1:2.6 to about 1:4.1, with about 1:2.6 being especially preferred. An excess of water would be avoided since an excess can result in needless waste of boric acid some of which inevitably remains in the water after the subsequent reaction is complete. On the other hand, if the boric acid to water mole ratio is so high as to leave undissolved acid in the reacting solution, boric acid concentration gradients can be established in the subsequently formed solid precipitate.

The resulting aqueous boric acid solution is heated to a temperature of at least about 70° C. and preferably from about 70° C. to about 80° C. These preferred temperatures increase the efficiency of the process and maximize the subsequent formation of the desirable strontium borate hydrate intermediate.

Strontium carbonate and europium oxide are added to the resulting aqueous boric acid solution which is preferably being agitated constantly. The molecular ratio of $SrCO_3$ to $H_3BO_3$ in the resulting mixture is from about 1:4 to about 1:4.5 and preferably about 1:4.28. The content of the $Eu_2O_3$ is from about 0.003 moles to about 0.015 moles and preferably about 0.009 moles to about 0.01 moles.

This mixture is then digested at a temperature of at least about 90° C. for a sufficient time to form a solid precipitate comprising a strontium borate hydrate intermediate and a liquor. The preferred digestion temperature is from about 90° C. to about 100° C. with from about 95° C. to about 100° C. being especially preferred. The digestion time is dependent on the temperature with longer times being required for the lower temperatures. At the preferred temperatures, the preferred digestion times are from about 5 hours to about 8 hours.

As a result of the digestion, a solid precipitate comprising a strontium borate hydrate intermediate is formed. The major portion of this solid consists essentially of $SrB_6O_{10} \cdot 5H_2O$. Other phases present in the solid include $Eu_2O_3$, or $EuBO_3 \cdot xH_2O$ and a pre-determined amount of residual strontium carbonate.

The resulting digestion mixture is then allowed to cool slowly to room temperature, preferably with continuous agitation.

The solid is then separated from the resulting liquor by any standard technique such as filtration.

The solid is then dried preferably at a temperature of about 120° C. The solid should be essentially completely dry or acid variations can occur in the final product.

It is preferred that after the drying step, the resulting dried phosphor cake be broken up by gentle grinding prior to the firing step. Grinding facilitates workability of the material after the subsequent firing step, that is, if unground chunks from the dried material are fired, they become excessively hard and may require extensive milling to reduce them to powder form.

The dried solid is then fired in an atmosphere consisting essentially of from about 0.3% to about 3.0% and preferably about 1% by volume hydrogen and the balance nitrogen at a temperature of at least about 800° C. for a sufficient time to produce the final phosphor. The major portion of the final phosphor has the compostion as described previously. The reaction is carried out preferably at from about 890° C. to about 960° C. for from about 6 hours to about 24 hours and most preferably at from about 910° C. to about 920° C. for from about 6 hours to about 10 hours. Firing conditions depend to some extent on the crystal size which is desired. For example, higher temperatures and longer firing times result in larger crystals. It is preferred that the solid be fired in open quartz crucibles because quartz is unreactive to the starting materials and to the phosphor. Open crucibles or boats facilitate escape of water and the hydrogen reduction of $Eu^{+3}$ to $Eu^{+2}$ which occurs in the firing.

The resulting fired phosphor can be dry or wet milled to enable it to pass through a 200 mesh screen.

The process of this invention produces a phosphor with a well-defined, strain-free crystal structure, an intrinsic brightness of nearly twice that of previous phosphors. Furthermore, the process for producing the phosphor is less complex than previously reported processing methods. For example, essentially only one step, the digestion step is necessary to produce the europium doped $SrB_6O_{10} \cdot 5H_2O$ intermediate which is to be fired to form the final phosphor, whereas with other methods, more steps are required to form the final europium doped compound. Such is the case in the processes of U.S. Pat. Nos. 3,431,215 and 3,431,216 in which, for example, a strontium halogen is added in a separate step. Also, the process of this invention does not require the use of volatile and/or environmentally objectionalbe reagents such as acetone and ammonia, or halogens nor does it require dry mixing/milling of reactants as is done in other processes such as the process in the above named patents. The final phosphor is prepared by a one-step firing as opposed to the two step firing operation of the above named patents.

In Table 1 are shown the relative radiance data of the phosphor of this invention versus a prior art phosphor.

TABLE 1

| Sample | Origin | Relative Radiance | | | |
|---|---|---|---|---|---|
| | | 0 Hr. | 100 Hr. | UVA | UVB |
| 1 | Process of U.S. Pat. No. 3,431,215 | 2890 | 2812 | 4.44 | 0.18 |
| 2 | This invention (Example 1) | 3317 | 3235 | 5.39 | 0.10 |
| 3 | This invention | 3472 | 3382 | 5.41 | 0.10 |
| 4 | This invention (Example 2) | 3366 | 3273 | 5.67 | 0.11 |

The data in Table 1 shows that the relative radiance of the phosphor of this invention is higher than the prior art phosphor.

Table 2 shows particle size characteristics of the phosphor of this invention prepared by the process of this invention compared with the prior art phosphor of U.S. Pat. No. 3,431,215.

TABLE 2

| Sample | Coulter Counter Data | | |
|---|---|---|---|
| | 50% Size | % <2 | % >16 |
| Prior Art | 14.9 | 2.1 | 47.0 |
| This invention | 9.2 | 0.5 | 8.6 |

It can be seen that the 50% size of the phosphor of this invention is in the range of 7 to 12 and the coarse fraction, that is, the >16 fraction is made up of only about 8.6% of the particles as opposed to a higher coarser fraction in the prior art phosphor.

To more fully illustrate this invention, the following nonlimiting examples are presented.

EXAMPLE 1

Boric acid is dissolved in deionized water at about 70° C. A mixture of strontium carbonate and europium oxide is slowly added to the boric acid solution with continuous stirring. The temperature of the resulting slurry is increased to about 95° C. and digestion is continued for about 12 hours. The mole ratio of the reactants is about $1.00 SrCO_3 : 1:4.29 H_3BO_3 : 0.010 Eu_2O_3$. The resulting digestion mixture is cooled to room temperature and suction filtered. The filter cakes are broken up by hand and dried at about 120° C. The dried cakes are hammer milled to pass through a 60 mesh screen. The resulting screened material is then loaded into silica boats and fired in a tube furnace at about 940° C. in a 1% by volume $H_2$ atmosphere for about 7 hours. About 1200 g of this material is wet ball milled for about 15 minutes and passed through a 60 mesh screen. The screened phosphor is then added to about 12 liters of continuously stirred deionized water along with about 50 g of $Sr(OH).H_2O$. The solution is stirred continuously and held at about 95° C. throughout the ten minute wash. The phosphor is then allowed to settle and the wash solution is siphoned away. This strontium hydroxide washing procedure is repeated two more times followed by three additional water washes without the hydroxide. The washed phosphor is suction filtered and dried overnight at about 120° C. The dried material is screened through 200 mesh. The relative radiance data is shown in Table 1.

EXAMPLE 2

The preparation is similar to that in Example 1 except the digestion time is about 6 hours and firing temperature is about 912° C. About 16 kg of this fired material is treated as in Example 1 except the screened phosphor is added to about 40 gallons of deionized water containing about 800 g of $Sr(OH)_2.H_2O$ and stir washed for about 20 minutes per cycle. The resulting washed and suction filtered material is dried at about 102° C. for about 18 hours and then screened through 200 mesh. The relative radiance data of the phosphor produced by this example is shown in Table 1.

While there has been shown and described what are at present considered the preferred embodiments of the invention, it will be obvious to those skilled in the art that various changes and modifications may be made therein without departing from the scope of the invention as defined by the appended claims.

We claim:

1. A process for producing a europium activated strontium tetraborate UV emitting phosphor, said process comprising:
   (a) adding $SrCO_3$ and $Eu_2O_3$ to an aqueous solution of $H_3BO_3$ which is at a temperature of at least about 70° C., to form a mixture wherein the mole ratio of $SrCO_3$ to $H_3BO_3$ is from about 1:4 to about 1:4.5 and the $Eu_2O_3$ content is from about 0.003 moles to about 0.015 moles;
   (b) digesting said mixture at a temperature of at least about 90° C. for a sufficient time to form a solid precipitate comprising a strontium borate hydrate intermediate having the formula $SrB_6O_{10}.5H_2O$ and a liquor;
   (c) separating said solid from said liquor;
   (d) drying said solid: and
   (e) firing the resulting dried solid in an atmosphere consisting essentially of from about 0.3% to about 3.0% by volume hydrogen and the balance nitrogen at a temperature of at least about 800° C. for a sufficient time to produce the final phosphor the major portion of which consists essentially of strontium tetraborate as a host material doped with europium ions substituted for strontium ions, said final phosphor having a composition in percent by weight of from about 34.72% to about 35.80% strontium, from about 17.66% to about 17.78% boron, from about 0.37% to about 1.86% europium, and the balance oxygen, with said europium being relatively uniformly distributed throughout the balance of said phosphor.

2. A process of claim 1 wherein the mole ratio of $H_3BO_3$ to water in said aqueous solution is from about 1:2.6 to about 1:4.10.

3. A process of claim 1 wherein the temperature of said aqueous $H_3BO_3$ solution is from about 70° C. to about 80° C.

4. A process of claim 1 wherein said mole ratio of $SrCO_3$ to $H_3BO_3$ is 1:4.28.

5. A process of claim 1 wherein the $Eu_2O_3$ content in said mixture is from about 0.009 moles to about 0.01 moles.

6. A process of claim 1 wherein said mixture is digested at a temperature of from about 90° C. to about 100° C. for from about 5 hours to about 8 hours.

7. A process of claim 1 wherein said dried solid is fired at a temperature of from about 890° C. to about 960° C. for from about 6 hours to about 24 hours.

8. A process of claim 7 wherein said mixture is fired at a temperature of from about 910° C. to about 920° C. for from about 6 hours to about 10 hours.

9. A process of claim 1 wherein the firing is done in an atmosphere consisting essentially of about 1% by volume hydrogen and the balance nitrogen.

10. A process of claim 1 wherein the weight composition of said final phosphor is from about 35.17% to about 35.18% strontium, from about 17.71% to about 17.72% boron, from about 1.18% to about 1.25% boron, and the balance oxygen.

* * * * *